(12) United States Patent
Fontana et al.

(10) Patent No.: US 10,455,518 B2
(45) Date of Patent: Oct. 22, 2019

(54) DEVICE AND METHOD FOR THE POWER ADJUSTMENT OF A WLAN NETWORK

(71) Applicant: VOLKSWAGEN AKTIENGESELLSCHAFT, Wolfsburg (DE)

(72) Inventors: Dino Fontana, Gladbeck (DE); Sascha Jurthe, Hattingen (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 65 days.

(21) Appl. No.: 15/555,682

(22) PCT Filed: Jan. 14, 2016

(86) PCT No.: PCT/EP2016/050615
§ 371 (c)(1),
(2) Date: Sep. 5, 2017

(87) PCT Pub. No.: WO2016/142081
PCT Pub. Date: Sep. 15, 2016

(65) Prior Publication Data
US 2018/0049138 A1    Feb. 15, 2018

(30) Foreign Application Priority Data
Mar. 10, 2015    (DE) .......................... 10 2015 204 246

(51) Int. Cl.
*H04W 84/00* (2009.01)
*H04W 52/24* (2009.01)
(Continued)

(52) U.S. Cl.
CPC ....... *H04W 52/245* (2013.01); *H04W 52/367* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,251,457 B1 | 7/2007 | Davi | |
| 8,503,972 B2* | 8/2013 | Haler | G01S 5/0009 |
| | | | 455/404.1 |
| 2013/0310058 A1* | 11/2013 | Ibrahim | H04W 72/082 |
| | | | 455/452.1 |

FOREIGN PATENT DOCUMENTS

| | | |
|---|---|---|
| DE | 10228342 A1 | 9/2003 |
| DE | 102006023319 A1 | 12/2007 |

(Continued)

OTHER PUBLICATIONS

Qiao et al., New 802.11h Mechanisms Can Reduce Power Consumption, IT Pro, Mar./Apr. 2006, pp. 43-48, IEEE Computer Society.

(Continued)

*Primary Examiner* — Ayanah S George
(74) *Attorney, Agent, or Firm* — Barnes & Thornburg LLP

(57) ABSTRACT

A device for the power adjustment of a WLAN network in a bounded space including a first WLAN module in the space, which serves to communicate with at least one second WLAN module located in the space, and at least one reference WLAN module, wherein the reference WLAN module is designed so that WLAN signals from the first WLAN module are received and a signal intensity is determined and transferred to the first WLAN module, wherein the first WLAN module is designed so the transmission power of the first WLAN module is adjusted according to the transferred signal intensity from the reference WLAN module so the received signal intensity at the reference WLAN module is less than a specified threshold value. Also disclosed is a method for the power adjustment of a WLAN network in a bounded space.

12 Claims, 1 Drawing Sheet

(51) Int. Cl.
     *H04W 52/36*    (2009.01)
     *H04W 84/12*    (2009.01)

(56) References Cited

FOREIGN PATENT DOCUMENTS

| | | |
|---|---|---|
| DE | 60221200 T2 | 4/2008 |
| DE | 602004007995 T2 | 4/2008 |
| DE | 102012100192 A1 | 7/2012 |
| DE | 112010001335 T5 | 7/2012 |
| DE | 102014111815 A1 | 2/2015 |
| EP | 0755615 A1 | 1/1997 |
| EP | 1545076 A2 | 6/2005 |
| EP | 1563442 A2 | 8/2005 |
| EP | 1829401 A2 | 9/2007 |
| EP | 1835636 A2 * | 9/2007 ............ H04W 24/00 |
| EP | 1835636 A2 | 9/2007 |
| EP | 2109966 A2 | 10/2009 |

OTHER PUBLICATIONS

Search Report for German Patent Application No. 10 2015 204 246.4; dated Oct. 14, 2015.
Search Report for International Patent Application No. PCT/EP2016/050615, dated Mar. 15, 2016.

* cited by examiner

DEVICE AND METHOD FOR THE POWER ADJUSTMENT OF A WLAN NETWORK

PRIORITY CLAIM

This patent application is a U.S. National Phase of International Patent Application No. PCT/EP2016/050615, filed 14 Jan. 2016, which claims priority to German Patent Application No. 10 2015 204 246.4, filed 10 Mar. 2015, the disclosures of which are incorporated herein by reference in their entireties.

SUMMARY

Illustrative embodiments relate to a device and a method for adjusting the power of a WLAN network in a limited space.

BRIEF DESCRIPTION OF THE DRAWINGS

The disclosed embodiments are explained in more detail below with reference to the drawing, in which.

DETAILED DESCRIPTION

Figure 1:
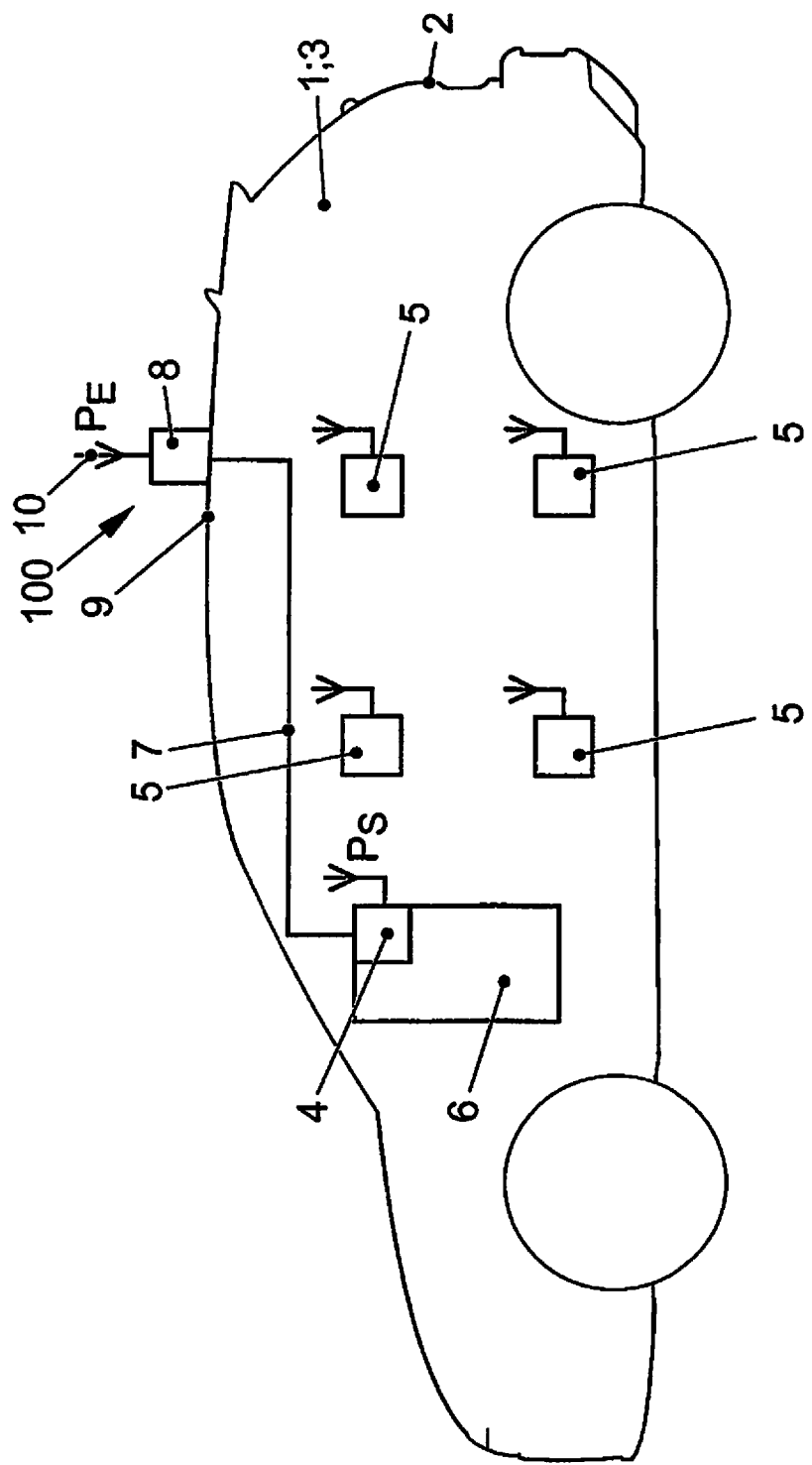
FIG. 1 shows a schematic block diagram of a device for adjusting the power of a WLAN network in a motor vehicle.

A WLAN network is understood as meaning a local radio network standardized, for example, in the IEEE 802.11 family of standards. In this case, a distinction is often made between an infrastructure mode and an ad-hoc mode, a WLAN module forming a WLAN access point for the network and coordinating all other WLAN modules in the network as clients in an infrastructure mode. In contrast, in ad-hoc networks, there is no central entity and the terminals undertake the coordination, ad-hoc networks being restricted with regard to the range and the number of WLAN modules.

It is known that an excessively high transmission power between two WLAN modules can result in interference in adjacent modules in other networks. An excessively high transmission power is also unfavorable in terms of energy.

DE 11 2010 001 335 T5 discloses a transmission power control method for controlling the transmission power used to transmit information in wireless communication between at least two movable terminal apparatuses from one terminal apparatus to another terminal apparatus. In this case, the transmission power is set to a value of $Ptx \geq Poffset-Prx$, where Prx is a measured value of the reception power in one terminal apparatus, which measured value relates to a predefined wireless signal which is transmitted from one of the other terminal apparatuses with a known electrical power. Poffset is a value of a maximum transmission power, which value is set in advance and is used for wireless communication between the terminal apparatuses in a predefined communication area. The transmission power between the two WLAN modules can therefore be adjusted, which saves energy and minimizes interference. A field of application of the method is a car2xWLAN network.

In addition to such applications, it is also known practice to use WLAN networks in limited spaces in which the movement between the WLAN modules is negligible in comparison with two relatively moving motor vehicles. In such WLAN networks in limited spaces, power adjustment of the transmission power is therefore not conventional.

The disclosed embodiments are based on the technical problem of improving a WLAN network in closed spaces and of providing a method for operating a WLAN network in an improved manner in closed spaces.

In this respect, the device for adjusting the power of a WLAN network in a limited space comprises a first WLAN module in the space, which module is used to communicate with at least one second WLAN module in the space. The device also comprises at least one reference WLAN module. The reference WLAN module is designed in such a manner that WLAN signals from the first WLAN module are received and a signal strength is determined. In this case, signal strength can be understood as being synonymous with reception power. This determined signal strength is transmitted to the first WLAN module. The first WLAN module is designed in such a manner that the transmission power of the first WLAN module is adjusted on the basis of the transmitted signal strength from the reference WLAN module in such a manner that the received signal strength at the reference WLAN module is less than a predefined threshold value. An upper threshold value and a lower threshold value may exist, the upper threshold value being intended to be undershot and the lower threshold value being intended to be exceeded. The predefined lower threshold value at the reference WLAN module is selected in such a manner that the second WLAN modules have a sufficient reception power of signals from the first WLAN module. For this purpose, the reference WLAN module is positioned, for example, at a location at which the reception is worse than at all conceivable positions of the second WLAN modules. Alternatively, this is compensated for by the level of the threshold value. In principle, the reference WLAN module can be part of the network, but it may also be a pure reference module and does not participate in active communication. In this case, the first WLAN module may be a WLAN access point, but the WLAN network may also be an ad-hoc network, with the result that the first WLAN module is only a selected WLAN module.

In at least one disclosed embodiment, the space is a motor vehicle. The energy saving is very beneficial in motor vehicles in this case. However, the suppression of interference signals to the outside (for example, to other motor vehicles) is also beneficial. Another benefit is that the WLAN network can be intercepted from the outside and can therefore be manipulated with more difficulty.

In another disclosed embodiment, the first WLAN module is assigned to an infotainment system of the vehicle or is part of an infotainment system. This can be used by all vehicle occupants to access the data using their WLAN modules or terminals and to make inputs.

In principle, the reference WLAN module can be arranged in the vehicle (that is to say in the space), for example, in the region of the rear shelf or on the rear window. If the first WLAN module is then arranged in the glove compartment, for example, the transmission signals must from the first WLAN module to the reference WLAN module through the entire vehicle, so that all second WLAN modules in between have better reception. In this case, the received signal strength at the reference WLAN module depends on the number and distribution of persons in the motor vehicle, with the result that the transmission power is adjusted situationally. The type of vehicle (equipment, length) also influences the signal strength and is therefore taken into account.

In another disclosed embodiment, at least the antenna of the reference WLAN module is arranged on the outside of the vehicle. The reception is worse in this position than in the interior of the motor vehicle with a high degree of certainty, and secondly the signal strength is set outside the motor vehicle, which may result in interference.

The reference WLAN module may, in principle, be a specific reference WLAN module for the WLAN network used in the motor vehicle. However, the reference WLAN module may be a car2×WLAN module, with the result that it has a dual function. In this case, use is made of the fact that the WLAN modules used for car2× according to IEEE 802.11p use the frequency range around 5.9 GHz, but their antennas are generally also able to receive 5 GHz (5160-5830 MHz) and 2.4 GHz (2400-2490 MHz).

In another disclosed embodiment, the reference WLAN module and the first WLAN module are connected to one another via a bus system, with the result that the first WLAN module does not have to receive in the frequency range of the reference WLAN module. The bus system may be a CAN or automotive Ethernet bus system, for example.

In another disclosed embodiment, the transmission power is adjusted continuously or periodically (for example, every 10 seconds). Alternatively or cumulatively, the adjustment can be carried out in an event-controlled manner, for example, when starting the motor vehicle or when door opening and closing is detected, since vehicle occupants may then have entered or left the vehicle.

In another disclosed embodiment, the device is designed in such a manner that the first WLAN module and/or the reference WLAN module can receive WLAN signals from the at least one second WLAN module and a signal strength is determined, the second WLAN module adjusting its transmission power on the basis of the transmitted signal in such a manner that the received transmission strength at the first WLAN module and/or at the reference WLAN module is less than a predefined threshold value. In this case, it should be noted that, if the received signal strength is evaluated at both modules, the threshold values for the two modules may be different.

With regard to the configuration of the method, reference can be made in full to the preceding statements.

FIG. 1 schematically illustrates a motor vehicle 1, the body 2 of which encloses a space 3. A WLAN network having at least one first WLAN module 4 and a plurality of second WLAN modules 5 is arranged in the space 3, four second WLAN modules 5 being illustrated in FIG. 1 by way of example. The first WLAN module 4 is part of an infotainment system 6 of the motor vehicle 1. In this case, the first WLAN module 4 can be permanently arranged in the motor vehicle 1. The second WLAN modules 5 can be both permanently arranged or installed in the motor vehicle 1 and assigned to mobile terminals. The first WLAN module 4 is designed in such a manner that a transmission power PS of the first WLAN module 4 can be changed. The first WLAN module 4 is connected, via at least one bus line 7, to a reference WLAN module 8 which is arranged on a roof 9 of the motor vehicle 1, with the result that an antenna 10 of the reference WLAN module 8 is outside the space 3. The reference WLAN module 8 is a WLAN module of a car2× network and is tuned to a different frequency than the WLAN network in the space 3. The first WLAN module 4 and the reference WLAN module 8 form a device 100 for adjusting the power of a transmission power PS of the first WLAN module 4, the antenna 10 of the WLAN reference module 8 being able to receive signals in the frequency band of the WLAN network.

In this case, the method of operation of the device 100 is as follows, for example: the first WLAN module 4 first of all transmits with a maximum transmission power PS,max or a predetermined transmission power PS which is below the maximum transmission power PS,max but is nevertheless relatively high. In this case, the transmission power PS of the first WLAN module 4 is sufficiently high, with the result that all second WLAN modules 5 have reliable reception. The reference WLAN module 8 now receives a signal with a signal strength PE on the basis of the transmission power PS of the first WLAN module 4. A lower limit value PE,unten can be determined by previously performed measurements. This value PE,unten is selected in such a manner that all second WLAN modules 5 have reliable reception at this value irrespective of the number and position of vehicle occupants in the motor vehicle 1. Furthermore, an upper limit value PE,oben is determined as a threshold value. In this case, PE,oben>PE,unten. In this case, the difference PE,oben−PE,unten is as small as possible, but the adjustability of the transmission power PS must be taken into account. If the reference WLAN module 8 then receives a reception power or signal strength PE>PE,oben, this value is transmitted back to the first WLAN module 4 via the bus line 7. The first WLAN module 4 then reduces its transmission power PS until the signal strength PE at the reference WLAN module 8 is less than PE,oben and is greater than/equal to PE,unten.

If this condition has been satisfied, it is ensured, with a reduced transmission power PS, that all second WLAN modules 5 have reliable reception and the interference radiation emitted from the space 3 is less than PE,oben, with the result that adjacent motor vehicles or other WLAN terminals have only minimal interference. Furthermore, this also makes it difficult to intercept the WLAN network from the outside.

In a similar manner, the method can also be carried out such that, starting from a minimum transmission power $P_S$, the latter is increased until $P_{E,unten}$ is exceeded and $P_{E,oben}$ is undershot.

The invention claimed is:

1. A device for adjusting the power of a WLAN network in an interior of a motor vehicle, the device comprising:
   a first WLAN module in the interior, the first WLAN module adapted to communicate with at least one second WLAN module in the interior; and
   at least one reference WLAN module,
   wherein an antenna of the first WLAN module is positioned at a first location of the motor vehicle, an antenna of the reference WLAN module is positioned at a second location of the motor vehicle spaced apart from the first location and outside of the motor vehicle, the reference WLAN module is configured to determine a signal strength of signals received from the first WLAN module and to transmit the determined signal strength to the first WLAN module, the first WLAN module is configured to adjust a transmission power of the first WLAN module based on the determined signal strength until the received signal strength at the reference WLAN module is less than a first predefined threshold value so that a signal strength of signal transmissions outside of the interior is minimized to minimize interference with other networks outside of the motor vehicle, and the first WLAN module is further configured to adjust the transmission power of the first WLAN module based on the determined signal strength so that the received signal strength at the reference WLAN module is greater than a second predefined threshold value to provide at least a minimum signal strength to the at least one second WLAN module between the first WLAN module and the reference WLAN module.

2. The device of claim 1, wherein the first WLAN module is assigned to an infotainment system of the motor vehicle or is part of an infotainment system of the vehicle.

3. The device of claim 2, wherein the reference WLAN module is a car2×WLAN module.

4. The device of claim 1, further comprising a bus system that connects the reference WLAN module and the first WLAN module, and the signal strength of the signal from the first WLAN module is transmitted from the reference WLAN module to the first WLAN module across the bus system.

5. The device of claim 1, wherein the transmission power is adjusted continuously, periodically and/or in an event-controlled manner.

6. The device of claim 1, wherein the first WLAN module and/or the reference WLAN module receive(s) WLAN signals from the at least one second WLAN module and determines a signal strength of the WLAN signals from the at least one second WLAN module, a signal is transmitted to the at least one second WLAN module based on the determined signal strength of the WLAN signals from the at least one second WLAN module, the at least one second WLAN module adjusts transmission power based on the determined signal strength of the WLAN signals from the at least one second WLAN module so the received signal strength of the WLAN signals from the at least one second WLAN module at the first WLAN module and/or at the reference WLAN module is less than a predefined threshold value.

7. A method for adjusting the power of a WLAN network in an interior of a motor vehicle, the method comprising:
transmitting a signal from a first WLAN module in the interior, the first WLAN module adapted to communicate with at least one second WLAN module in the interior;
receiving the signal with a reference WLAN module;
determining a signal strength of the signal with the reference WLAN module;
transmitting the determined signal strength from the reference WLAN module to the first WLAN module; and
adjusting a transmission power of the first WLAN module based on the determined signal strength until the received signal strength at the reference WLAN module is less than a first predefined threshold value and greater than a second predefined threshold value so that a signal strength of signal transmissions outside of the interior is minimized to minimize interference with other networks outside of the motor vehicle and to provide at least a minimum signal strength to the at least one second WLAN module between an antenna of first WLAN module and an antenna of the reference WLAN module, the first predefined threshold value being greater than the second predefined threshold value,
wherein the antenna of the first WLAN module is positioned at a first location of the motor vehicle and the antenna of the reference WLAN module is positioned at a second location of the motor vehicle spaced apart from the first location and outside of the motor vehicle.

8. The method of claim 7, wherein the transmission power is adjusted continuously, periodically and/or in an event-controlled manner.

9. The method of claim 7, wherein the first WLAN module and/or the reference WLAN module receive(s) WLAN signals from the at least one second WLAN module and determines a signal strength of the WLAN signals from the at least one second WLAN module, a signal is transmitted to the at least one second WLAN module based on the determined signal strength of the WLAN signals from the at least one second WLAN module, the second WLAN module adjusts transmission power based on the determined signal strength of the WLAN signals from the at least one second WLAN module so the received signal strength of the WLAN signals from the at least one second WLAN module at the first WLAN module and/or at the reference WLAN module is less than a predefined threshold value.

10. The method of claim 7, wherein the first WLAN module is assigned to an infotainment system of the motor vehicle or is part of an infotainment system of the vehicle.

11. The method of claim 10, wherein the reference WLAN module is a car2×WLAN module.

12. The method of claim 7, wherein a bus system connects the reference WLAN module and the first WLAN module, and the signal strength of the signal from the first WLAN module is transmitted from the reference WLAN module to the first WLAN module across the bus system.

* * * * *